United States Patent [19]

Bennington

[11] Patent Number: 5,240,416

[45] Date of Patent: * Aug. 31, 1993

[54] SIMULATOR APPARATUS EMPLOYING ACTUAL CRAFT AND SIMULATORS

[76] Inventor: Thomas E. Bennington, 669 Newton Sq., Coraopolis, Pa. 15108

[ * ] Notice: The portion of the term of this patent subsequent to Apr. 23, 2008 has been disclaimed.

[21] Appl. No.: 699,308

[22] Filed: Apr. 19, 1991

Related U.S. Application Data

[63] Continuation-in-part of Ser. No. 274,838, Nov. 23, 1988, Pat. No. 5,009,598.

[51] Int. Cl.⁵ .......................... G09B 9/08; G09B 19/16
[52] U.S. Cl. ......................................... 434/30; 434/39; 434/48; 434/49; 434/59; 434/66; 273/439; 244/75 R; 364/578; 455/12.1; 455/14
[58] Field of Search ....................... 434/29, 30, 35, 38, 434/43–45, 48, 49, 53, 59, 61, 62, 66, 69, 71; 273/439; 244/194, 197, 75 R; 364/578; 370/104.1; 358/54; 455/2, 13, 12.1, 14

[56] References Cited

U.S. PATENT DOCUMENTS

| | | | |
|---|---|---|---|
| 3,546,350 | 12/1970 | Reynolds | 434/35 X |
| 3,886,334 | 5/1975 | Cummings et al. | 434/30 |
| 4,059,909 | 11/1977 | Kron | 434/59 |
| 4,512,033 | 4/1985 | Schrock | 455/2 |
| 4,817,948 | 4/1989 | Simonelli | 434/71 X |
| 4,887,967 | 12/1989 | Letovsky et al. | 634/61 |
| 4,910,677 | 3/1990 | Remedio et al. | 273/439 X |
| 5,017,141 | 5/1991 | Relf et al. | 434/29 |

Primary Examiner—Richard J. Apley
Assistant Examiner—Joe Cheng
Attorney, Agent, or Firm—Richard C. Litman

[57] ABSTRACT

A simulator system adaptable to an actual craft or existing simulator is disclosed. The system comprises computer hardware and software capable of simulation, combinations of simulations and networked simulations. Computer inputs come from sensors attached on or near control and operation members. Computer output is sent to overlay displays and other components. Visual, audio and motion cuing systems are added to increase realism where appropriate to the simulation. All equipment may be quickly and easily installed or removed so as to make maximum use of an otherwise inoperative craft or allow for diversity and upgrading of existing simulators. By the use of computer program modifications and component construction, the system may be used to simulate a wide variety of craft, including air, ground, naval and space craft.

2 Claims, 7 Drawing Sheets

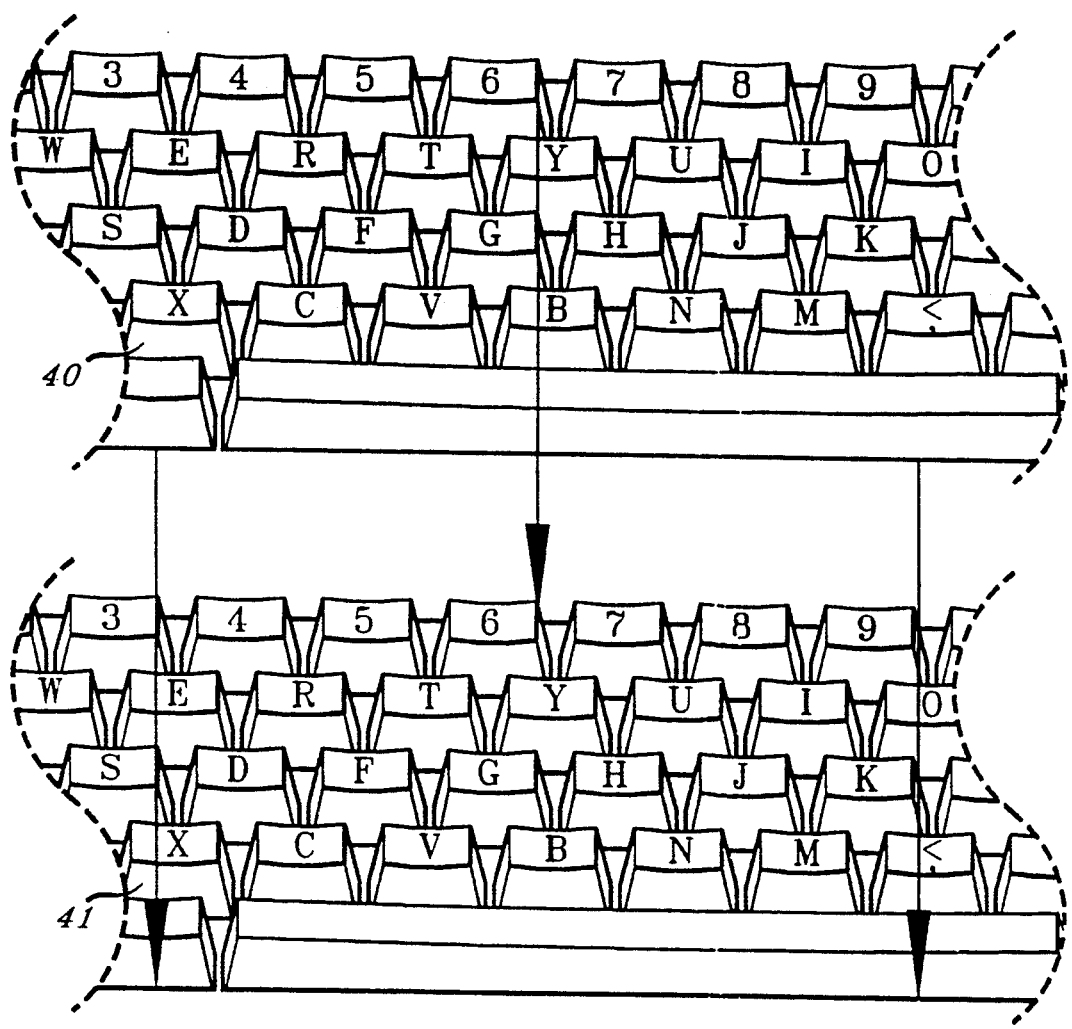
FIG. 5D
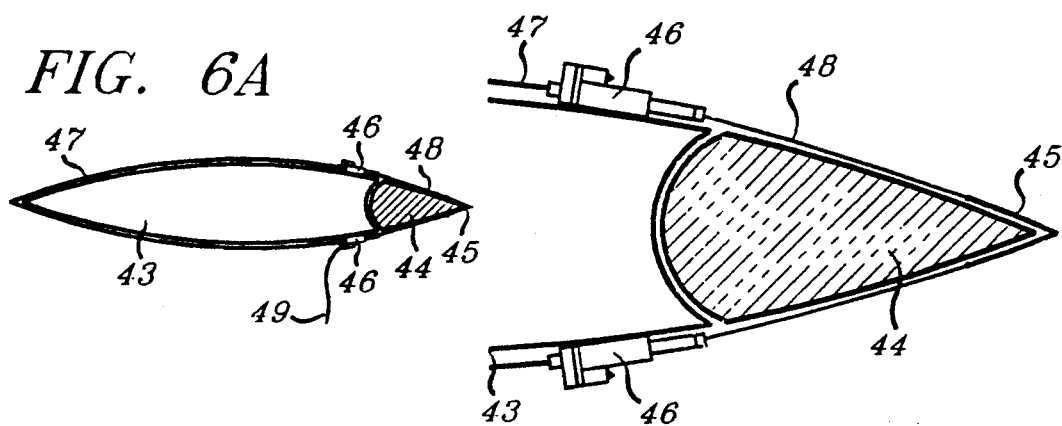
FIG. 6A
FIG. 6B

Normal Pilot's Seat

Both G-Seat Cushions Installed

Forward Thrust Applied

Upward Thrust Applied

Downward Thrust Applied

Braking

SIMULATOR APPARATUS EMPLOYING ACTUAL CRAFT AND SIMULATORS

REFERENCE TO RELATED PATENT APPLICATION

This application is a continuation in part of U.S. patent application Ser. No. 07/274,838 filed on Nov. 23, 1988, now U.S. Pat. No. 5,009,598.

BACKGROUND OF THE INVENTION

1. Field of the Invention

The present invention relates generally to the field of personnel training simulator devices, and specifically to a system utilizing computer interactive "overlays" and other components to fully simulate the instruments and systems of any craft, as well as upgrading existing simulator apparatus through retrofitting them with the present system.

2. Discussion of the Prior Art

It has long been recognized that devices which simulate air, space, land or nautical craft have many benefits for instruction of personnel in systems training and operation of such craft. Thus, attempts have been made to develop cost-effective and realistic simulator systems and equipment so as to provide a simpler and more economical training means than that of actually operating craft for operational instruction, systems instruction or military training. One of the primary difficulties in constructing such simulators is providing sufficient realism to produce a worthwhile training experience for those personnel using such a device while considering costs, maintenance and other factors.

Initially, simulator training devices were produced using the actual instruments of the particular craft being simulated. As these instruments were generally vacuum or electrically powered mechanical devices, as for example some aircraft instruments, such simulators required very complex electrical, pneumatic and mechanical support systems in order to operate properly. As technology advanced, digital electronics generally replaced many of the older mechanical, electrical, and pneumatic systems previously used. As technology advances further, optical computers may likely replace digital computers to provide more capability and versatility with the more complex systems. Since the cost, variety and complexity of such specialized technical equipment required for efficiently training a person in the operation of the newer craft increases along with the complexity and systems of the machines being developed, in some cases actual operation of a craft has proven more economical and far more instructive than simulator training.

Newer simulators are far more realistic than those using the older systems, but are nevertheless comparatively costly due to the small relative number in use, the necessary complexity of the systems simulated, and the requirement for realism that dictates a complete, full scale duplicate of the craft cockpit or cab be constructed. They are also limited in their scope of craft and operations which are simulated. Systems are known which disclose methods of providing flight training, such as those taught in U.S. Pat. No. 3,546,350 to Reynolds and U.S. Pat. No. 4,490,117 to Parker. In these cases, however, the devices provide simulation of only a portion of the instrumentation normally used in instrument flight; the actual aircraft must be flown to provide the remainder of the sensations and experiences so important in flight training, as well as a full understanding of the aircraft's related systems. As a result, such training obviously equals or exceeds the costs involved in standard flight training, and such costs rapidly become prohibitive in the case of larger and/or more complex aircraft. Another system, disclosed in U.S. Pat. No. 3,363,331 to Hunt, teaches the use of digital electronics in an aircraft simulator, thereby allowing easier programming of such simulators in order to more readily and accurately duplicate the characteristics of individual aircraft types. However, again, the invention of Hunt necessitates use of specially constructed equipment for the simulator environment, and is limited in scope as to the craft simulated, in this case an aircraft. A weapons training system for armored ground vehicles is disclosed in U.S. Pat. No. 4,789,339 to Bagnall-Wilde, but the invention requires system-powered usage of almost all features of the actual equipment within the vehicle, up to and including the actual firing of real projectiles, to obtain a degree of realism. The system of Bagnall-Wilde also requires alteration of the existing equipment, making the system too costly, time consuming, and worthless with regard to instruction of other systems in the vehicle, or any other craft.

There are other problems to consider with simulation devices, such as the commonly known syndrome of "simulator sickness", which occurs when a person training in a simulator sees things which the body does not physically experience. Unless a simulation for certain types of instruction in different craft accords the necessary motion and audio simulation in concert with the video simulation presented, the result is uncontrollable physical disorientation that causes nausea and vomiting. Thus, for some craft, the most desirable simulation apparatus for a safe and fully comprehensive training experience is a full simulation with motion, audio and video capability, synchronized to coordinate the sights, sounds and movement of the simulator apparatus which would normally occur during routine operation of an actual craft. However, such systems are extremely expensive to construct and maintain, and even the more complete and advanced simulator configurations recently developed do not train personnel to all systems, including navigation, weapons and engine operations, and again are limited in the number of craft which one may simulate. Meanwhile, even simulators which have already been constructed must be constantly retrofitted with newer and more complex devices to keep pace with the ever-growing and changing complexity of instruments and systems in the more newly developed craft. Also, actual craft may be available on a temporary basis due to maintenance, scheduling or other reasons, or may even be permanently "parked", but cannot be employed for simulation purposes because their systems are only responsive in actual use and therefore would not provide the necessary realism for an efficient simulator environment.

The present invention has overcome many of the problems and requirements of comprehensive simulator construction by providing a system for simulating the full scope of training events in even the most complex craft, including the operations of any related navigation or engine operations and weapon systems, which affords a realistic training environment while practicing maximum economy by precluding the need for expensive, incomplete and continuous retrofit of conventional stand-alone simulators, or costly operation or modification of actual craft.

SUMMARY OF THE INVENTION

The present invention provides a realistic simulation in an inoperative craft, or by retrofit in existing stand-alone simulators, for all of the operational and systems training requirements. By "inoperative craft", it is meant that the systems of the craft, whether for maintenance reasons or simply because it is not scheduled for use, are not powered up and operating, so the controls of the craft will not affect a change in status of the engine, location or operation of the craft. A craft may be "operative" in that it is ready for use, but that is not required for the present system. Also, existing simulator apparatus can be easily, quickly and inexpensively upgraded to wider range of craft and complete systems simulation, thus making them extremely efficient.

The present invention interfaces digital or optical logic with switch, knob and lever position sensors or simulated switches and keyboards as input, and overlays simulating instrumentation, control pressure feedback, and visual, audio and motion cuing as output. The present system can employ conventional simulation software or any specially designed modification. The present simulator system utilizes existing components in craft or can control existing systems in simulators as well as adding thereto, and can be networked, for example by transmission lines or satellite communications, to concertize a variety of craft or simulators or both, even if they are not at the same location. The present system is simple, time and cost effective, and efficient enough to fully instruct a single individual in the complete operation of the craft and all of its systems, or allow diverse groups of craft and/or simulators to simultaneously engage in concertized simulation, such as warfare environment maneuvers between military installations in different parts of the country.

Therefore, a primary object of the present invention is to provide an improved system of comprehensive training in an actual craft or a simulator apparatus.

Another object of the present invention is to provide a realistic ground-based training environment by using actual craft or existing simulator apparatus in combination with computer interactive overlays and position sensors, thereby allowing the actual existing operation and control members, such as levers, knobs, switches, keyboards, pedals, control columns and yokes of the craft and simulator to be used, as well as simulating the instruments and control and operation members to upgrade a less complex simulator, or where design considerations are a factor.

A further object of the present invention is to provide a simulator system with means of producing control pressure feedback to a trainee, so that existing or simulated controls and components function with the same action and force as that which occurs during operation of an actual craft for the conditions being simulated.

An additional object of the present invention to provide synchronized simulated motion, visual and audio effects when necessary to provide the realistic movement, sights and sounds normally associated with actual craft operation.

Another object of the invention is to provide capability for training of one individual using one actual craft or existing simulator, or many individuals simultaneously using diverse crafts and/or simulators.

Other objects will more readily appear as the nature of the invention is better understood from the following specification and claims, with reference being made to the attached drawings.

BRIEF DESCRIPTION OF THE DRAWINGS

FIG. 5D is a front perspective illustration of an overlay for placement over an existing onboard keyboard panel.

FIG. 6A is a cross section of a control pressure feedback means in position on an existing member of the craft.

FIG. 6B is an enlargement of the details of FIG. 6A.

DESCRIPTION OF THE PREFERRED EMBODIMENT

Figure 1:
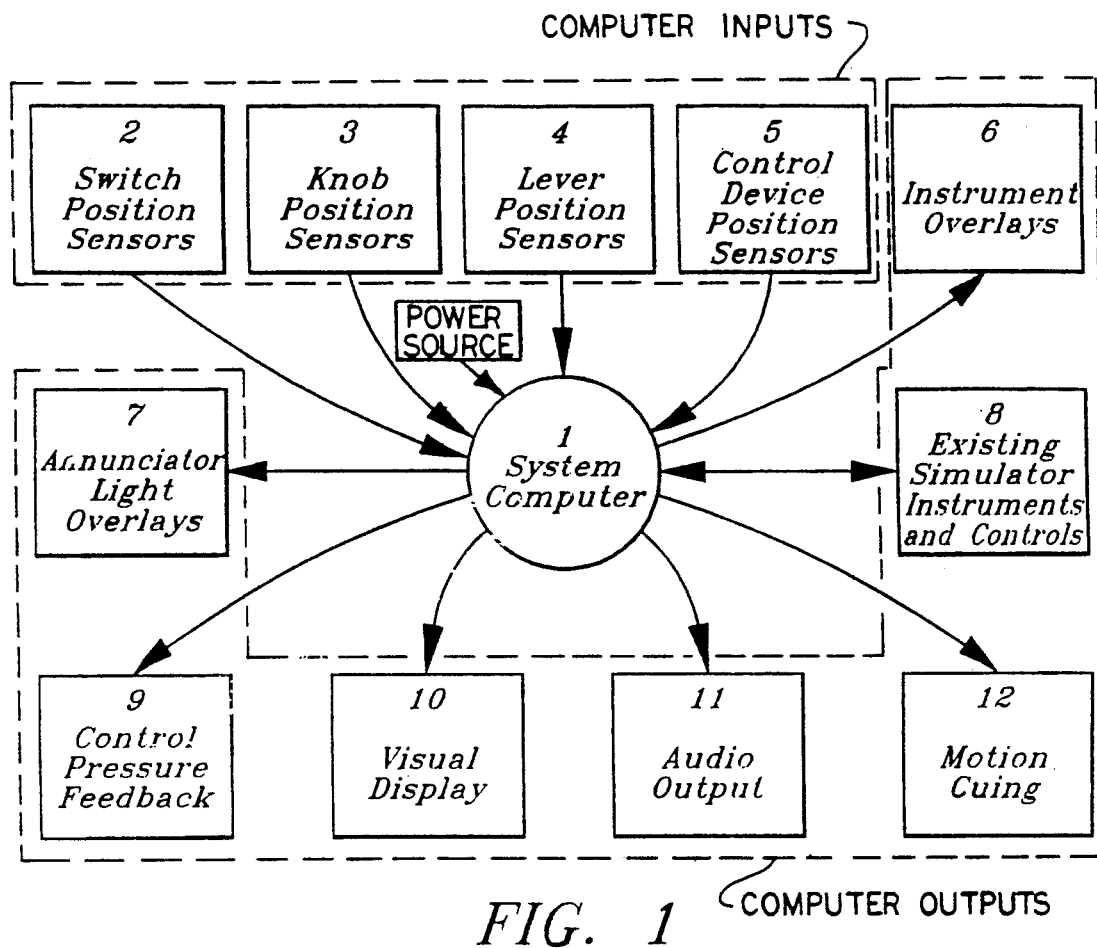
FIG. 1 is a block diagram of the basic operating system of the present invention showing the key elements and their computer interaction.

Referring now to the drawings, a block diagram of all of the components for use with the simulator system of the present invention is shown in FIG. 1. In this system, computer 1 receives input from devices which detect all switch positions 2, knob positions 3, lever positions 4 and control device positions 5, applicable to the simulation. Existing systems in different craft may range from a toggle switch to keyboard input, and various sensors are employed for each application, or an overlay is used to simulate members such as a keyboard or toggle switch when craft or panel design must be considered. Computer 1 processes the information received from the sensors and calculates an appropriate output concerning instrument readings, lights actuated, cuing, etc. from the software program employed. Any suitable conventional simulation program such as the simulation program fully disclosed in U.S. Pat. No. 5,017,141, issued May 21, 1991, to Richard S. Relf et al. which teaches the use of a computer program to run a simulator) may be utilized, such as those already developed, or a specially designed program for a particular application. Computer 1 may be digital or optical, portable or mainframe, and of any hardware configuration capable of enabling and managing the simulation system. In the case of large and complex simulations, such as that employing a program to coordinate instructional simulation between a variety of craft or simulators, or both, or simulation between trainees at different locations, a host computer, such as in FIG. 10, would concertize each computer 1 of each individual system to allow all personnel to participate in and experience the simulation simultaneously. Output from all craft and simulators networked to the host computer would determine the output of the host computer to all computers 1 and thereby to each system aboard each craft or simulator.

The usual power means may be employed in the case of stand-alone simulators which are retrofit or upgraded with the present invention, or an outside power source may be used to enable computer 1. In the preferred embodiment for use on an actual craft, power for computer 1 and all other systems relating to the present simulator system is supplied by a source other than the craft being used. In this manner, all existing switches in the actual craft may be operated without the necessity for use of the onboard batteries or power plants, so components in the craft which may have a limited permissible operating time between overhaul or replacement will not be activated, thus retaining such limited time as there may be for actual system usage under real operating conditions. As computer 1 receives the sensor inputs, it processes the inputs according to the software program being used and calculates the output. Computer 1 then outputs the correct response to overlays 6 and 7, and/or interactive existing simulator instruments 8, and control pressure feedback 9. The overlays are computer simulated instrumentation, annunciator lights, computer screens, etc.; any device in the craft or simulator may be simulated by use of these overlays. In a stand-alone simulator apparatus, the overlays may be used to update the existing instrumentation, and additional overlays may be set up where space is available to simulate more than the existing instrument capability of the simulator. Position sensors could also be attached to the existing knobs, levers, switches, and control devices in the simulator, and computer 1 would interact not only with the overlays but also with the existing instrumentation, if desired. In this manner, an existing simulator becomes much more versatile and cost-efficient, since the present invention can easily modify the apparatus to simulate different crafts and more systems, thereby allowing a much greater range of simulation than that to which the simulator was previously limited.

Figure 2:
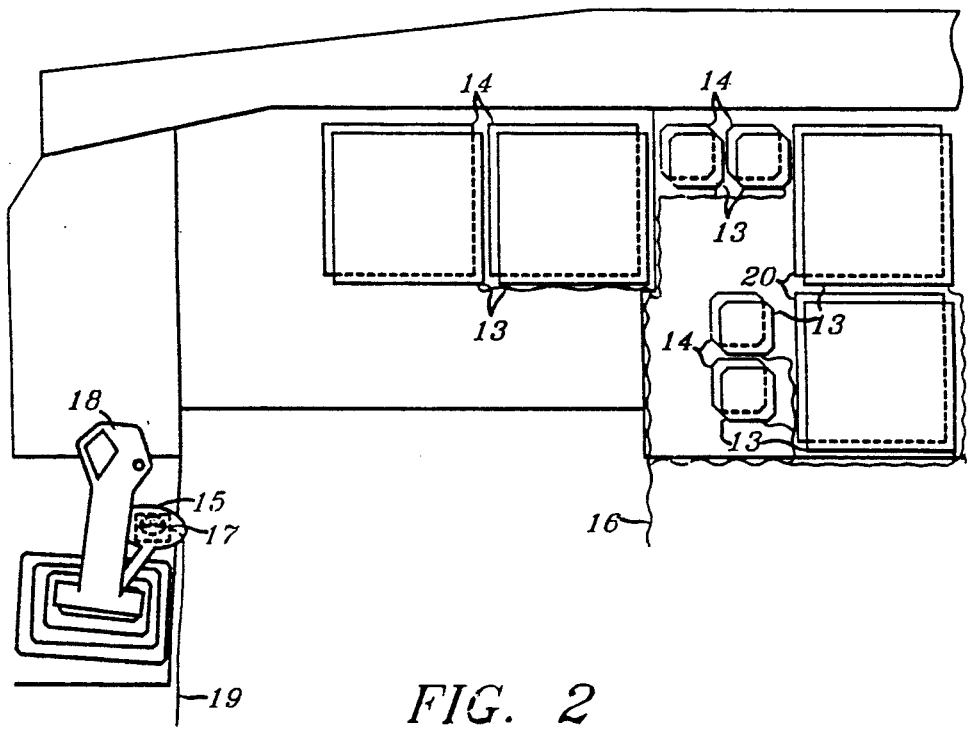
FIG. 2 is a perspective view of an overlay of the present invention in position to simulate the instrument panel of an aircraft, with a position sensing means illustrated.

Overlays 13 of the present invention are representative of a typical instrument panel, using an aircraft as an example, and one type of position sensor, a trackball 17, is shown in FIG. 2. The overlays 13 are constructed using monochrome or color liquid crystal displays (LCD), electroluminescent displays (EL) or other similar type of flat panel displays, as design requirements dictate. It is envisioned that flexible panels may be constructed to not only sense keyboard input, but also to simulate various of the instrumentation of many craft. The usual aircraft flight instrument panel, without tactical/weapons, terrain mapping, navigational, engine and system considerations, consists of an airspeed indicator, attitude indicator, altimeter, turn and slip indicator, directional gyro and vertical speed indicator. These instruments 14 comprise what are normally considered to be the basic flight instruments in a typical aircraft. The instruments comprising this or any other overlay may obviously be constructed singly, in a size equal to that of individual craft instruments, as shown, or as a grouping of instruments. The individual instrument overlays 13 or the individual overlay is driven by output from computer 1 by means of wiring harness 16 so as to simulate instrument representations. Other instrument overlays 20, individually or in a grouping, represent the craft's navigation, engine, system, terrain mapping and weapon systems, and are constructed and operated in a similar manner to that of the overlays 13. Such overlays may be retained in position by any suitable attachment means, such as suction cups or VELCRO, and are affixed to the craft instrument faces, or are merely suspended over the instruments they simulate. Although not shown in the drawings, it will be appreciated that instrument overlays may also be mounted individually in association with other existing instrument displays, such as engine and other related systems instruments, and appropriately tied in with the computer 1 to simulate the particular instrument they cover. In simulator apparatus which does not include one or more of the particular systems necessary for fully simulation training, this would easily be accomplished by addition, where space is available, of one or more instrument or other overlays, keyboard and computer screen simulation, etc.

Also in FIG. 2, a position sensing trackball 17 is shown temporarily attached to a stationary cockpit side panel and a mechanical position transmitter 15 transmits position of the aircraft's sidestick 18. This may be a trackball or equivalent sensing device, mechanical or non-mechanical, which inputs the movement of sidestick 18 to computer 1 through wiring harness 19 when sidestick 18 is moved forward, aft, left or right. Computer 1 then calculates the proper output to the instrument overlays 13 and simulates the results of the trainee's action upon sidestick 18.

Figure 3:
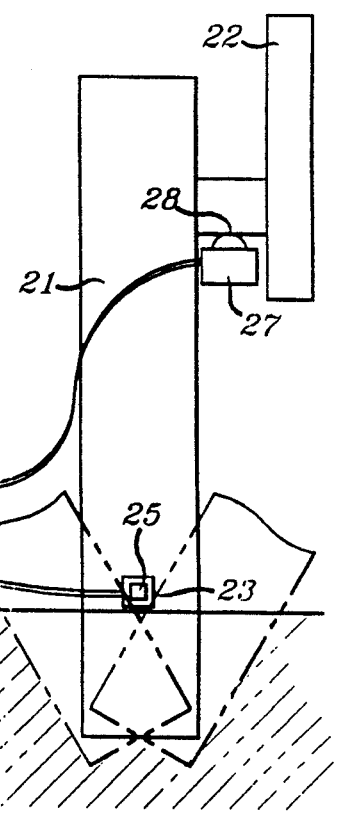
FIG. 3 is a schematic side illustration of position sensing means on a steering column and wheel.

A control column 21 and control yoke 22 is shown in FIG. 3. In aircraft, for example, control yoke 22 rotates at the top of column 21 to provide roll control. Pitch control is provided by fore and aft movement of the entire column 21. In the preferred embodiment, a roller rheostat 23 or equivalent sensor means is temporarily affixed to the aircraft floor 24 so as to bear against the side of the base of column 21. As column 21 is moved fore and aft, roller 25 alters the resistance of rheostat 23, which transmits an appropriate signal by means of wiring harness 26 to computer 1, which processes the signal and transmits the appropriate output to the instrument overlays and other devices. Roll input is detected in a similar manner by means of roller rheostat 27, which is affixed near the top of the control column 21 so as to bear against the rotary shaft on which control yoke 22 is rotated. When roller 28 is actuated, rheostat 27 delivers appropriate input to computer 1 through wiring harness 29 in a like manner to that of roller rheostat 23.

Figure 4:
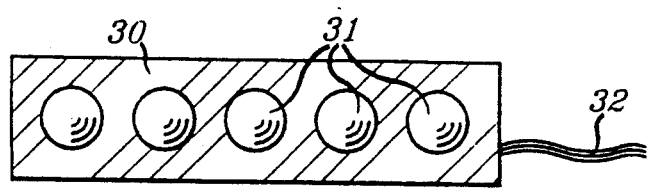
FIG. 4 is a front plan view of an overlay of the present invention simulating an annunciator light panel.

FIG. 4 of the drawings discloses an example of an overlay 30 to simulate the illumination of various annunciator lights 31. Such lights 31 contained within overlay 30 may consist of light emitting diodes (LED), LCDs, incandescent bulbs, or other means, and are activated from output of computer 1 by means of wiring harness 32.

Figure 5A:
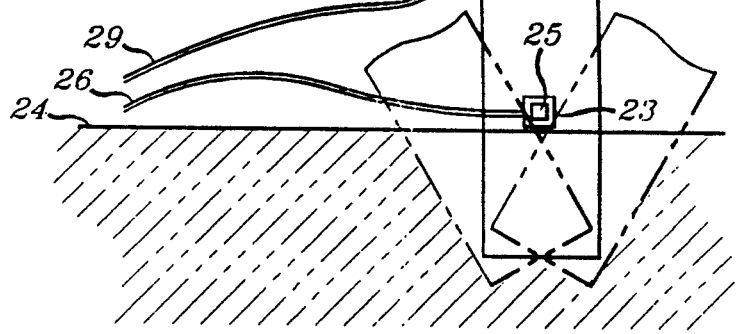
FIG. 5A is a front perspective view of an overlay of the present invention showing placement over an existing bank of toggle switches in the craft.
Figure 5B:
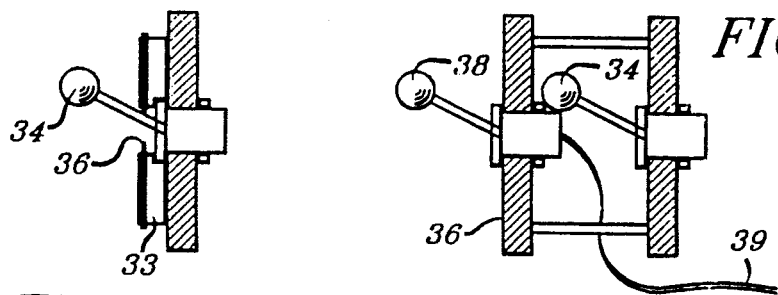
FIG. 5B is a cross section of an overlay of the present invention showing placement over an existing toggle switch with position sensor means.

A switch overlay 33 is shown in FIG. 5A. The typical switch 34 may be a two or perhaps three position toggle switch, and the switch overlay 33 provides a means of detecting the position of any switch 34 contained within the overlay 33, and inputs this information to computer 1 through wiring harness 35. This may be accomplished as shown in FIG. 5B, in which the position of a switch 34 is detected by switch position sensors 36 encased within switch overlay 33. Switch position sensors 36 may consist of microswitches or other sensing means. One of the switch position sensors 36 will be closed depending upon the position of toggle switch 34, or if toggle switch 34 is a three way switch with a central position, neither of the switch position sensors 36 will be closed. The actuation of switch position sensors 36 is then transmitted to computer 1 by means of wiring harness 35. Light detecting devices may also be used in place of microswitches as switch position sensors 36. Such light detecting devices may operate by detecting the difference in light falling upon them depending upon the position of switch 34, as switch 34 blocks the light available to sensors 36.

Figure 5C:
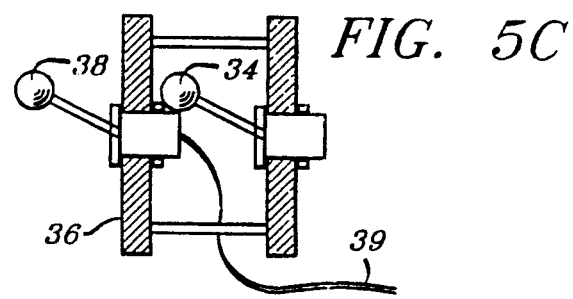
FIG. 5C is a cross section illustrating an alternate switch means overlay employed due to instrument design considerations.

Another embodiment of a switch overlay 37 is shown in FIG. 5C. The typical switch 34 is not used due to design considerations and alternate switch overlay 37 with a duplicate switch 38 of switch 34 provides a means of reproducing the functions and tactile feel of switch 34 without the actual use of switch 34. The actuation of switch 38 is then transmitted to computer 1 by means of wiring harness 39.

The overlays of the present invention are also used as simulations of keyboard control panels 40, and are constructed to be placed directly over an existing keyboard 41 in an actual craft, as shown in FIG. 5D, or may be made as a keyboard for temporary installation to upgrade a stand-alone simulator. The keyboard overlay is equipped with any conventional pressure sensor, not shown, in each key, which senses the touch pressure of the typist and inputs the information through wiring harness 42 to computer 1, which computes the total input and outputs to the various overlays accordingly. An overlay may also be used as a representation of the computer screen to which the keyboard would input during normal operation of the craft and which would then receive a simulated display of information.

In an inoperative craft, pedals, brake mechanisms, spoilers, and other control devices, not shown, obviously may be equipped with equivalent means to that of the roller rheostat 23 on control column 21 as shown in FIG. 3 so as to provide input to computer 1. An alternate means of detecting position may be a two dimensional position sensing device similar to a personal computer "mouse" or the like, not shown, which is secured to a control device where appropriate to detect its movement. As the control device is actuated, the spherical element of the mouse-type sensor is rotated and the resultant signal transmitted to computer 1 by means of a wiring harness. This type of sensor would be compatible with many control devices, as they may be actuated axially or in a rotary motion, so the mouse-type position sensor will detect motion in either direction or combinations of possible directions as its spherical element bears against and is rotated by movement of the control device. An optically operated mouse-type sensor or equivalent may be used in place of a mechanical sensor. In this manner, control device actuation is sensed to a very fine degree and input to computer 1, which can then provide immediate signals to drive representations of instruments within overlay 13 and other instrument representations as appropriate. In simulator situations, the same position and pressure sensors may be employed to determine the movement of existing members in the simulator, and overlays containing simulated switches and other controls may be interfaced with existing operation and control members to make the simulator employable for instruction of all craft systems.

Since the present invention may be used in an actual craft, it is necessary to provide tensioned feedback to the trainee operating the existing control devices to experience the realism in the action of the control. If a control device were able to be manipulated by the trainee without the pressure produced by the control that would normally occur during actual craft operation, the experience in simulation would not prepare the trainee for the action of the control device during actual operation of the craft. Therefore, provision is made for control pressure feedback 9 output from computer 1 to the various existing control devices or other components of a craft. For example, a typical aircraft flying surface 43 with flight control surface 44 is shown in FIG. 6A and in an enlarged manner in FIG. 6B. A V-shaped element 45 is installed over flight control surface 44 in the manner of a typical flight control lock. Element 45 is connected through connectors 48 which are driven by electric or hydraulic motors 46 in order to provide pressure on the flight control surface 44, which tension is then communicated to a trainee handling the controls in the cockpit. Motors 46 are controlled by computer 1 by means of appropriate programming known in the art through relays 49. Motors 46 are secured in position on flying surface 43 by means of tie-down means 47 which extends forward from one motor 46 around the leading edge of flying surface 43 and back to the other motor 46 on the opposite side of flying surface 43. In this manner realistic pressures of normal flying maneuvers, stall buffet, or other pressures may be simulated by commands from computer 1 to actuate one or both of motors 46 and thereby operate the flight control surface 44. This system may of course be used on any control surface for flight control, such as wings and ailerons, stabilizer and elevator, vertical fin and rudder for example, or on other craft for rudders, stabilizers and other control surfaces.

Figure 6C:
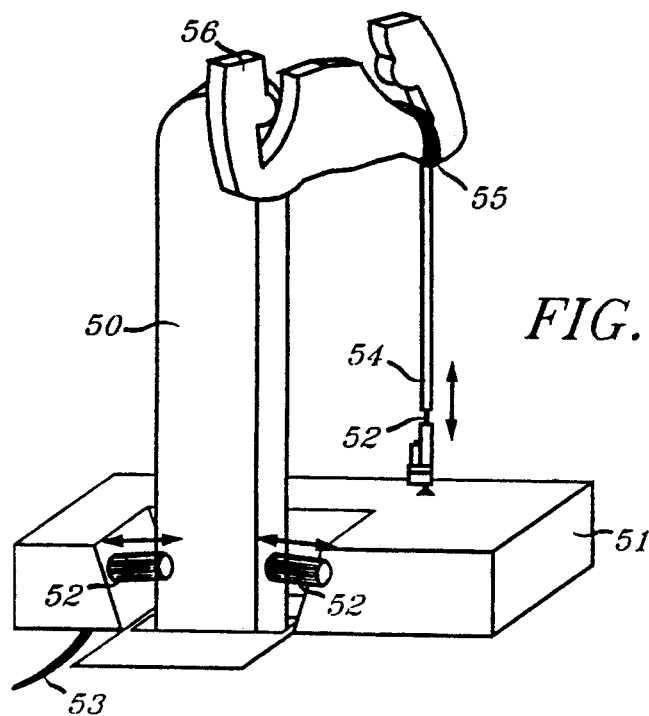
FIG. 6C is a side perspective view of another embodiment of control pressure feedback means on a steering column and wheel.

Other conventional means may be employed to impart control pressure feedback 9 output to the control devices inside the craft, such as is shown in FIG. 6C. For example, control pressure feedback 9 output from computer 1 may be directed to various control devices within the craft itself, such as control column 50. In FIG. 6C, a control column 50 much like that of FIG. 3 is illustrated. The control pressure feedback mechanism for such a column 50 consists of a control stand 51 which is open on one side so as to be simply installed at the base of control column 50. The control pressure feedback mechanism contains forward and aft pistons 52, which may be electrically or hydraulically operated and are controlled by output from computer 1 through wiring harness 53. Forward and aft pistons 52 produce differential pressures against the base of control column 50, thus causing fore and aft movement of the column 50 and requiring counter pressure from a trainee using the simulator in order to contain the movement, much as in an actual craft as would occur in flight. A vertical piston 52 operates in a similar manner, but is connected through a coupling 54 to attachment collar 55 at its uppermost end which attaches piston 52 to control yoke 56 in order to impart rotary motion to the control yoke 56 positioned atop control column 50. In a like manner to the counter pressure required in order to prevent fore and aft movement of control column 50, counter pressure must be applied to control yoke 56 in order to prevent its movement, thus stimulating inflight control pressures. Vertical piston 52 may be connected to control yoke 55 utilizing a flexible coupling 54 near its lower end, so as to allow fore and aft movement of control column 49. Similar or equivalent devices may be affixed to controls in other craft to produce realistic control pressure feedback for such controls. Control device position sensor means may be combined with the control pressure feedback devices in order to simplify the number of components of the simulator system of the present invention.

Other output from computer 1 to operate visual, audio, or motion cuing systems are added in applications when necessary, as determined from the parameters of the simulation.

Figure 7A:
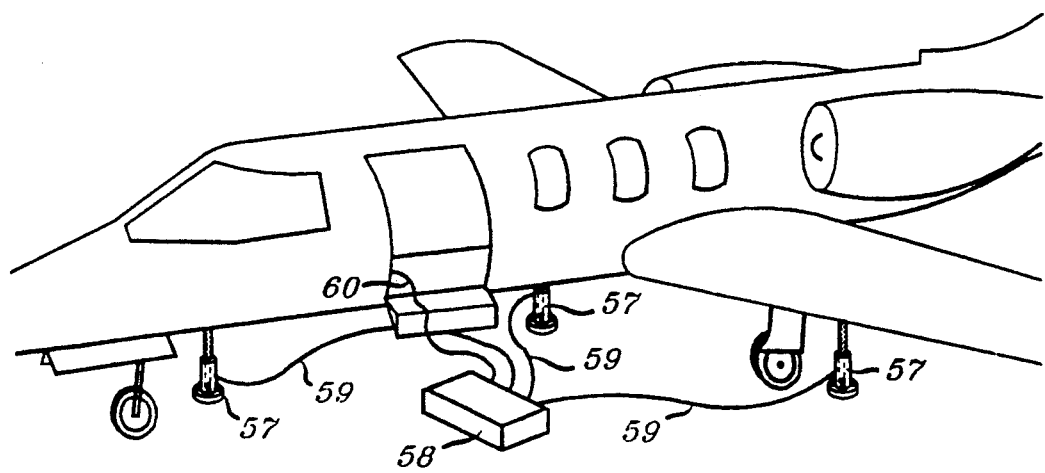
FIG. 7A is a schematic of an embodiment of motion cuing means for an aircraft.

Any conventional means may be employed to produce motion cuing means 12 as output from computer 1 to the craft or simulator. For example, in FIG. 7A is illustrated a motion cuing means applied to an actual aircraft. Devices similar to standard aircraft jacks 57 or the equivalent may be placed beneath the aircraft's design jack points to provide pitch and roll sensations, or other simulated motions. These jacks 57 are normally hydraulically actuated, particularly as used on larger aircraft, and the output from computer 1 may be directed to unit or units 58 by means of input line 60, and used to actuate one or more units 58 providing hydraulic pressure to the jacks 57 through lines 59. Other systems may of course be used, such as individual hydraulic control units at each lift point, electric lift/tilt means, etc., and various motion cuing means would be used for diverse craft according to the craft design. In stand-alone simulator apparatus using the present invention, output 9 would be linked from computer 1 to the existing motion cuing means of the simulator, or appropriate known motion producing means such as already described would be added. In application for a land craft, such as a tank for example, motion cuing may be accomplished by a platform type motion device similar to those used to provide motion for conventional simulators. It is envisioned that sling-carrying cranes may be controlled to provide motion cuing to sea craft nested in the sling device, or a gyroscopic device which holds a simulator cab may be used to cue motion in the type of craft which has all modes and directions, such as an air or space craft or submarine. These motion cuing methods may also be combined with existing systems in simulator apparatus, such as free-fall or gravity force in air and space craft, to enhance the effectiveness of the simulation, and ground vehicles may also utilize the motion cuing system of jacks shown in FIG. 7A.

Figure 7B:
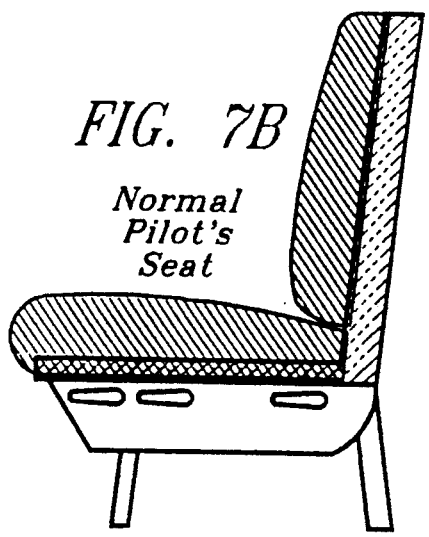
FIGS. 7B-7G are cross section illustrations of one embodiment of motion cuing means of the present invention.
Figure 7C:
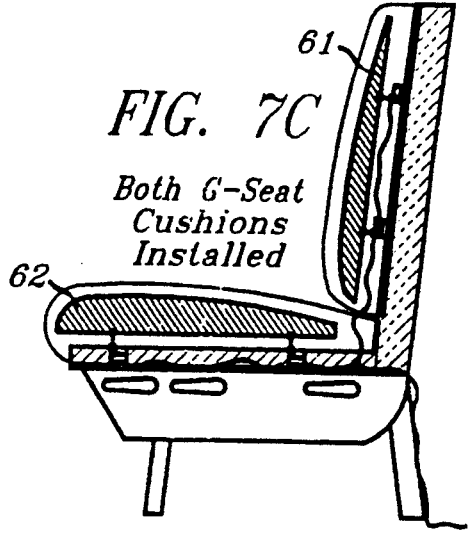
Figure 7D:
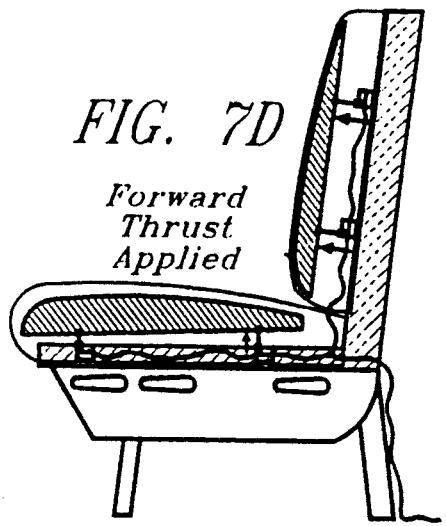
Figure 7E:
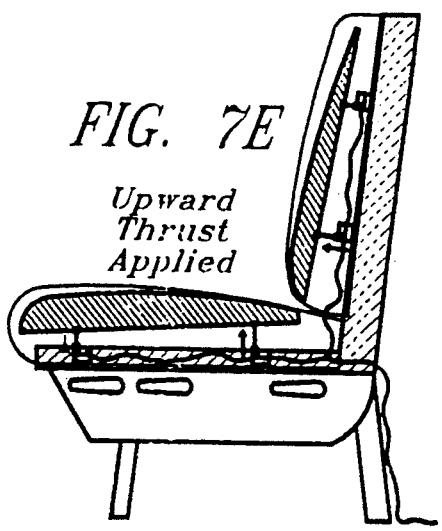
Figure 7F:
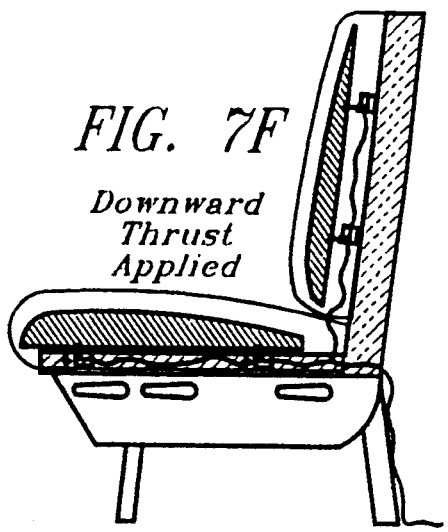
Figure 7G:
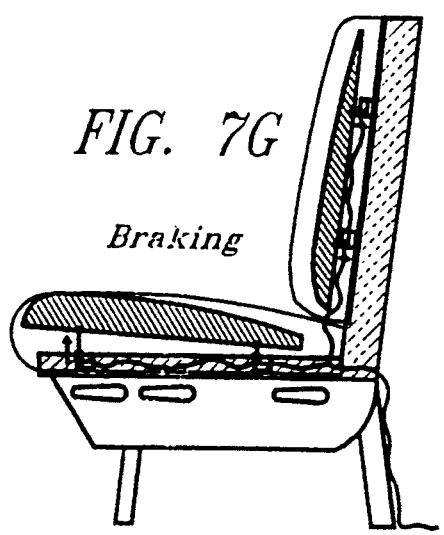

Another method of providing motion cuing is illustrated in FIGS. 7B–7G. In FIG. 7B is shown, in cross section, a typical crewmember's seat in a craft. By installing devices in place of the craft's cushions, as shown in FIG. 7C, motion onset cues are provided through output 12 of computer 1 by applying force to the back and bottom cushions of the operators' seat. Throughout a simulation program, various input to computer 1 as the control devices are manipulated would activate motion cuing output 12 to simulate upward, downward, forward and braking thrust upon the trainee by motion of the cushions 61, 62 against the trainee's back and posterior. For example, in FIG. 7D, a sensory motion of forward thrust is provided through a lifting action by the cushions to press against the back and seat of the trainee, which would impart the physical feeling to the trainee of being pushed back into the seat, which is the physical action resulting from forward thrust. In FIG. 7G, braking thrust would be simulated by upward motion of the seat cushion 62, with the back cushion 61 exerting no pressure, resulting in a lift of the seat under the knees and a complementary upper body forward motion, which imparts the physical feeling equivalent to a braking thrust. This particular motion cuing means would be inexpensive and easy to install, and could be used in virtually any craft. Any other conventional means of providing motion for craft may also be used in conjunction with the invention.

Figure 8:
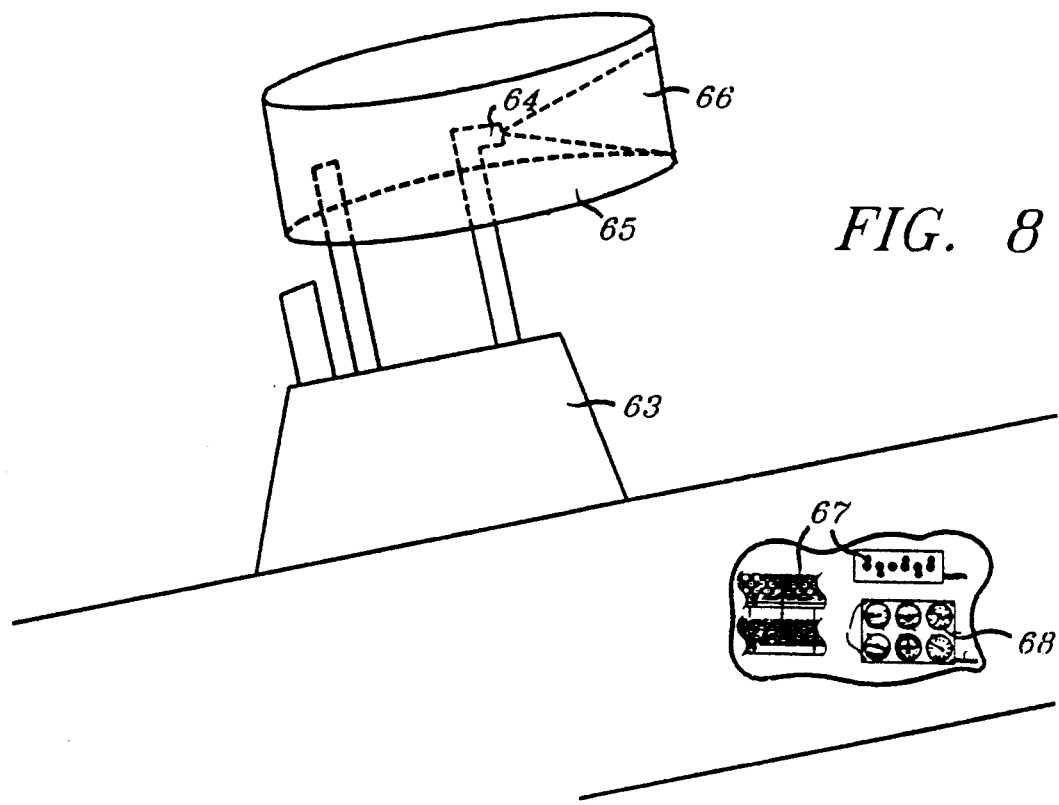
FIG. 8 is an illustration of one embodiment of video cuing of the present application.

By means of a computer interactive overlay, positioned immediately within or without a windshield or viewing port of a craft, simulated visual effects from visual display 10 can be provided in response to the input from the sensors to computer 1 and the conditions of the simulation. As shown in FIG. 8, a submarine tower 63 with a periscope 64 would easily have mounted thereon a "surround screen" of conventional construction or of a computer interactive overlay of the present invention. According to the input from the sensors 67 inside the craft for the switches, knobs, levers, keyboards, etc., visual display 10 would output a seascape environment so that manipulation of the periscope would result in a 360 degree simulated visual display with a high degree of realism to the trainee. Existing simulator apparatus would use its own video cuing system, which would be interactive with computer 1, or may also be retrofit with a simulated visual display overlay to simulate a windshield or viewing port. If an actual craft or simulator is equipped with internal view screens, such as television screens supplied with "visuals" by means of outside cameras, these screens may also utilize the display overlays to simulate exterior scenery which would change in response to the changes in direction or environment during the simulation.

Figure 9:
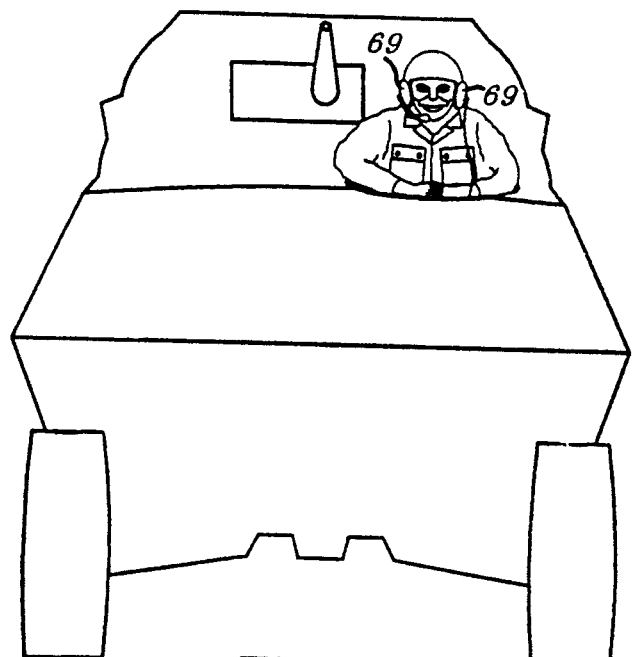
FIG. 9 is an illustration of one embodiment of audio cuing of the present invention.

The illustration in FIG. 9 shows an embodiment of audio cuing 11 from computer 1. Computer interactive audio output 11 simulates realistic sounds to a speaker or to standard headphones 69, such as shown worn by the pilot of the tank, and typically found in many craft. Audio output 11 includes the entire spectrum of sound effects, including voice communications between trainees using the simulator apparatus and others involved in the simulation, sounds which result from actions taken by the trainees operating the simulator corresponding to those of the actual device being simulated, and realistic external sounds corresponding to the external environment.

Figure 10:
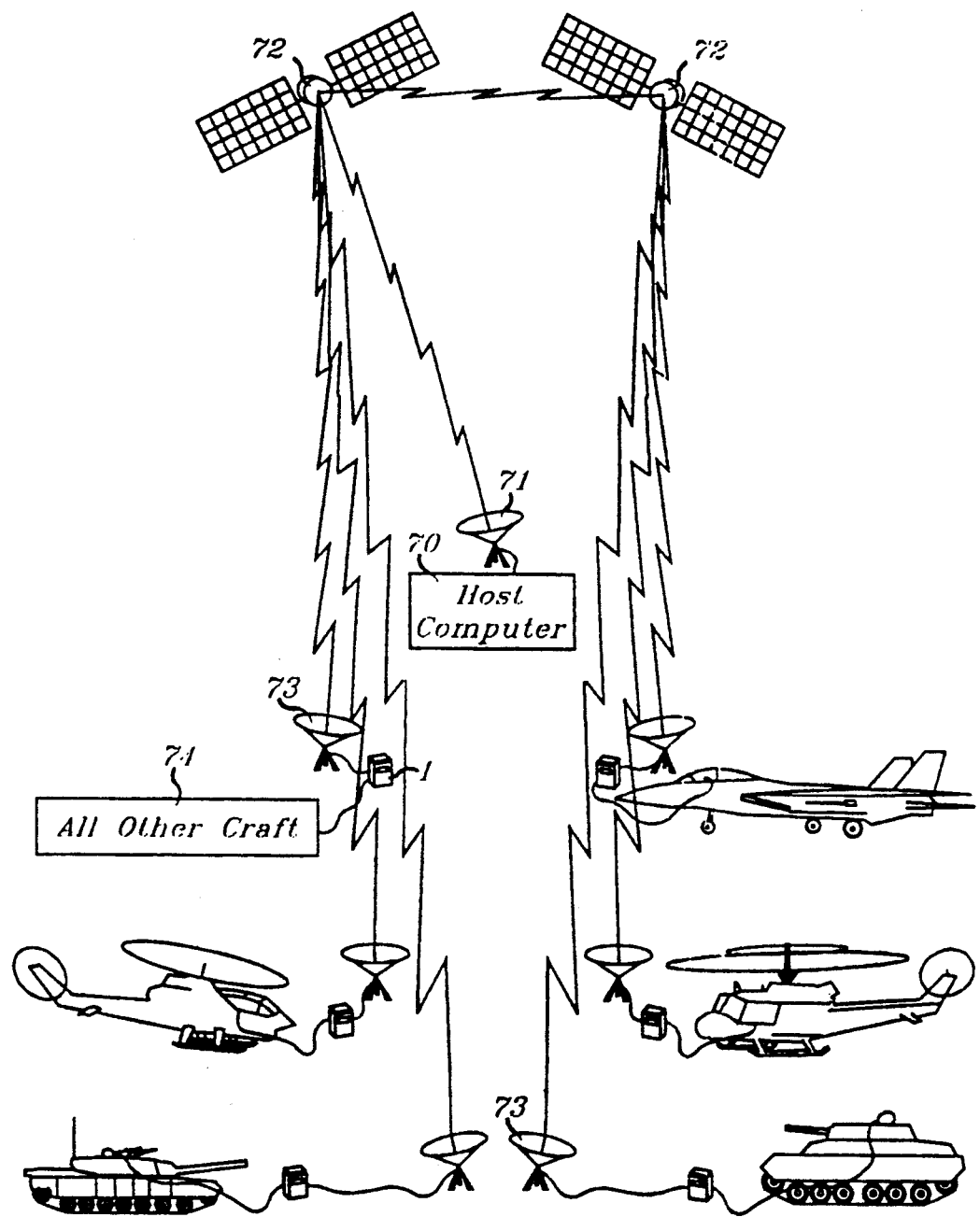
FIG. 10 is an illustration of the present invention in use with combined fleets for concertized simulation instruction between two groups of individuals.

With installation of the components of the present invention, a single craft or simulator may easily provide realistic, total simulation to fully train personnel in the various instrument familiarity and responses necessary for safe and enhanced operation of the craft. However, for more complex situations, such as between complements of personnel at different locations, the present invention allows for concertized simulation of training exercises between combined fleets of craft or simulators, or both, and provides cost effectiveness for permanently garaged craft through such use. An illustration of the present invention in such use is shown in FIG. 10.

A host computer 70, networked with each computer 1 of each system aboard each craft or simulator through transmission lines (not shown) or communication through satellite transmission antenna 71 by means of satellites 72 to receiver antennas 73, would concertize a simulation program for all craft and simulators employed, or craft and simulators 74 at any other location.

The diversity, versatility and ease of use attained by this system allows superior training of personnel which far exceeds those methods and systems currently used. Further, the present invention makes the simulation process as cost effective as possible while retaining realism and effectiveness short of actually operating a craft. Installation time is minimized through the use of the overlays and components of the present invention when compared to prior methods and systems, and manufacture costs are comparably nominal. Therefore, it is to be understood that the present invention has application far beyond, and is not limited to, the embodiments described above, but encompasses any and all embodiments within the scope of the following claims.

What is claimed is:

1. A simulator system for use with at least one craft and at least one simulator comprising:
   a plurality of simulators;
   a plurality of actual crafts;
   at least one computer having an input and an output and including a computer program for running at least one simulator;
   a power source for said computer;
   at least one removably mountable overlay means;
   each said overlay means including display means for displaying information;
   said display means including connection means to said output of said computer, light generating means, audio cuing means, video cuing means and motion cuing means;
   each said overlay means having at least one position sensor means, wherein each of said position sensor means is removably mountable on each of at least one existing control device for sensing the position of each said control device;
   each said position sensor means including connection means to said input of said computer, and pressure feedback means removably attachable to an existing control device for providing pressure feedback to said computer;
   said pressure feedback means having pressure sensor means for sensing pressure upon said pressure sensor means;
   each said overlay means having at least one simulated switch thereon;
   each said switch including connection means to said input of said computer;
   said input and said output of said computer including connection means to each said at least one existing control device for control thereof;
   whereby input from each said sensor means to said computer is calculated through said computer program and said computer outputs an appropriate response to said display means of each said overlay means for instructional simulation;
   another computer having networking means to network with and control each said at least one computer of said at least one simulator from said computer program; and
   said networking means including transmission lines and satellite communications for communicating between each of said plurality of simulators and each of said plurality of actual crafts.

2. A simulator system for use with at least one craft and at least one simulator comprising:
   a plurality of simulators;
   at least one computer having an input and an output and including a computer program for running at least one simulator;
   a power source for said computer;
   at least one removably mountable overlay means;
   each said overlay means including display means for displaying information;
   said display means including connection means to said output of said computer, light generating means, audio cuing means, video cuing means and motion cuing means;
   each said overlay means having at least one position sensor means, wherein each of said position sensor means is removably mountable on each of at least one existing control device for sensing the position of each said existing control device;
   each said position sensor means including connection means to said input of said computer, and pressure feedback means removably attachable to an existing control device for providing pressure feedback to said computer;
   said pressure feedback means having pressure sensor means for sensing pressure upon said pressure sensor means;
   said input and said output of said computer including connection means to said existing control devices for control thereof;
   whereby input from each said sensor means to said computer is calculated through said computer program and said computer outputs an appropriate response to said display means of each said overlay means for instructional simulation;
   another computer having networking means to network with and control each said at least one computer of said at least one simulator from said computer program; and
   said networking means including transmission lines and satellite communications for communicating between each of said plurality of simulators.

* * * * *